Patented Sept. 29, 1936

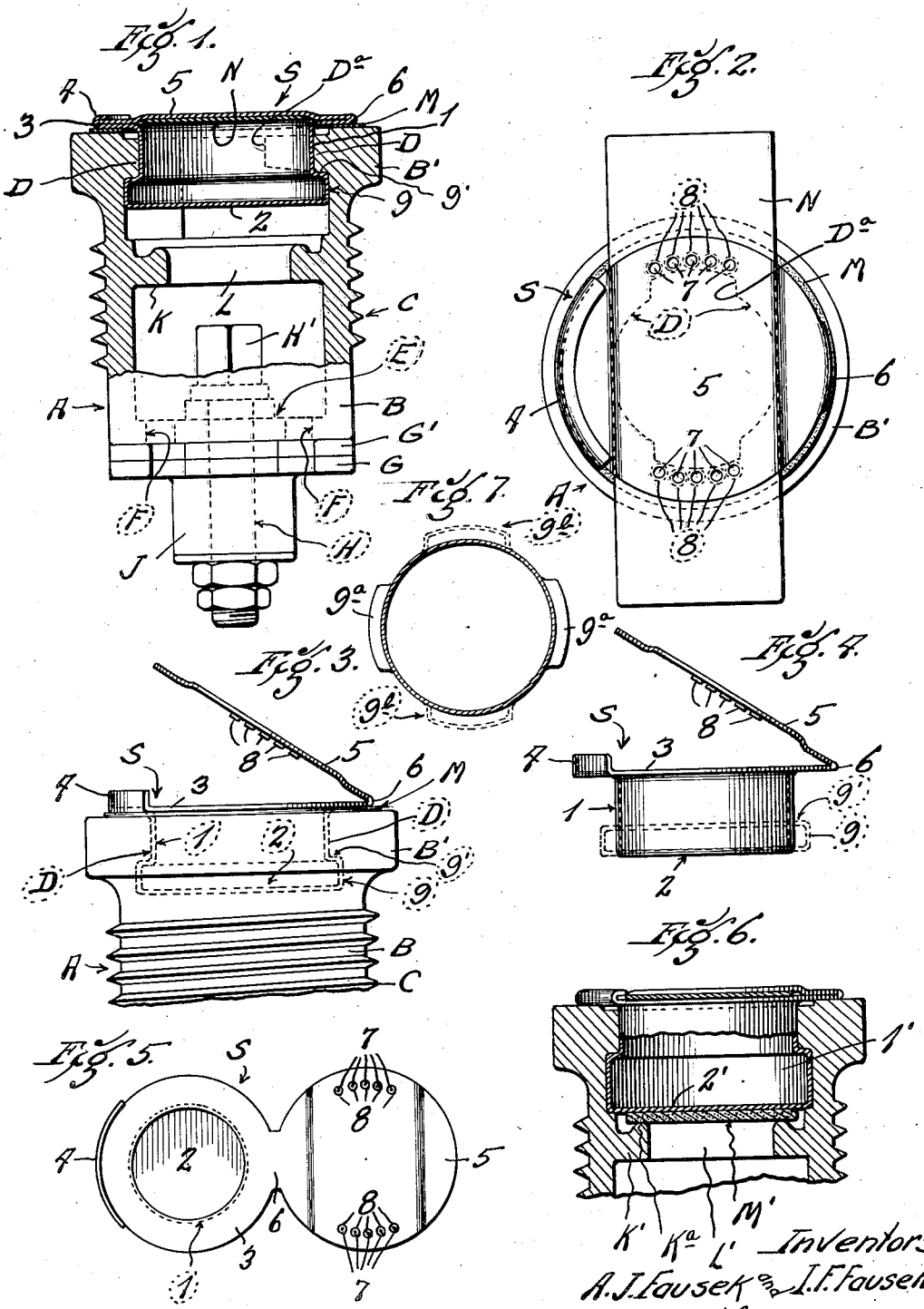

2,056,043

UNITED STATES PATENT OFFICE 2,056,043

SEAL

Arthur J. Fausek and Irwing F. Fausek, Clayton, Mo.

Application March 21, 1934, Serial No. 716,582

6 Claims. (Cl. 217—114)

This invention relates generally to sealing devices, and more specifically to sealing devices adapted particularly for use with valves of the type known as lager valves, which are used in association with beer barrels and kegs for closing certain openings in the walls of the barrels and kegs until proper fittings have been applied to the valves, the predominant object of the invention being to provide an extremely simple seal of the sort mentioned which will perform its intended function in a very efficient manner.

As is well known to persons familiar with such matters, barrels and kegs which serve as containers for beer are provided with openings formed through the walls thereof that receive valves. Ordinarily each barrel or keg is provided with two of such openings and valves, one of the openings providing the outlet for the beer and the other opening providing an inlet for pressure gas. The valves used in association with beer barrels or kegs are of more or less standard construction, each thereof including a hollow outer body within which a non-circular valve stem is located. Also within the outer, open end of the hollow body inwardly projected portions are provided which are complementary to similar projected portions on the fitting that is attached to the valve, and these complementary projections on the valve and fitting serve as means for connecting the fitting to the valve. The fitting is also provided with means for engaging the non-circular stem of the valve, and when the fitting is rotated with respect to the valve for the purpose of connecting the fitting to the valve, the stem is rotated at the same time in a manner to open the valve.

When the fittings are not applied to the valves of beer barrels and kegs, the hollow bodies of said valves are entirely open at their outer ends so that dirt and other foreign matter may collect in said valve bodies, for instance, when the barrels or kegs are being transported to their places of use or are awaiting use at such places. Also, as the valves are now used no means is provided by which a retail distributor of the beer may determine whether or not a barrel of beer has been tapped by unauthorized persons prior to delivery or use by him.

In view of the foregoing, we have devised the improved seal disclosed herein which, briefly stated, comprises an element formed preferably of soft metal, a portion of which is adapted to be inserted into the hollow body of the valve and expanded therein so as to be securely fixed in place. When the seal has been applied to the valve, it prevents any dirt or other foreign matter from entering the valve body, and as the seal may not be removed without mutilating same any attempt of an unauthorized person to tap a barrel or keg of beer to which the seal has been applied may be readily detected. In addition to the foregoing, the improved seal is so constructed and used that it provides a convenient mode of attaching the Government stamp to a beer barrel or keg.

Fig. 1 is an enlarged view, partly in elevation and partly in section, of a lager valve having the improved seal associated therewith and showing a representation of a Government stamp associated with said seal.

Fig. 2 is a plan view of the valve, seal, and stamp shown in Fig. 1.

Fig. 3 is a fragmentary elevation of a portion of a valve with which the improved seal is associated, the seal being shown as it appears before the Government stamp has been arranged in place and engaged by the seal.

Fig. 4 is a view of the seal showing same as it appears before being applied to a valve.

Fig. 5 is a plan view on a reduced scale showing the seal as it appears prior to application to a valve.

Fig. 6 is a fragmentary sectional view of a valve having a modified form of the invention applied thereto, the form of seal shown in this view including a closure element associated therewith which seals the valve within the outer hollow body thereof.

Fig. 7 is a horizontal section of a modified form of the seal.

In the drawing, wherein are shown for the purpose of illustration, merely, two embodiments of the invention, A designates a lager valve of conventional design. The lager valve A includes an outer, hollow body B having a flange portion B' at one end, and provided with screw-threads C formed on the circumferential face thereof which serve to secure the valve to a barrel or keg when the valve is screwed into an opening in the wall of the barrel or keg. Within the upper portion thereof the hollow valve body is provided with inwardly extended portions D shaped and arranged to provide the socket portion of a bayonet joint that receives a properly shaped portion of a fitting (not shown), which is adapted to be connected to the valve body. The valve body includes a wall E which closes one end of the valve body and openings F are formed through this wall. Also the valve A includes a rotatable valve element G, which is provided with a facing G' of rubber or other suitable material and is fixed to a stem H, this stem being fixed within a sleeve portion J forming a part of the valve element G and being provided with a non-circular end portion H'. The lager valve A is provided with a wall K through which an opening L is formed, said wall being located within the hollow body of the valve inwardly of the open end thereof, as shown in Fig. 1.

Referring now to our improved seal S, this element comprises a main body portion 1, which preferably is of substantially cylindrical formation and is closed at one end by a solid wall 2. The seal S by preference is formed of soft metal or other suitable material. At the end of the main body portion of the seal opposite to the end thereof at which the solid wall 2 is located, an outwardly extended flange 3 is provided which preferably is formed integral with the main body portion. The flange 3 surrounds the open end of the main body portion of the seal, as shown most clearly in Fig. 5, and projected upwardly from a portion of the marginal edge of said flange is an arcuate extension 4 which serves a purpose to be hereinafter referred to.

Formed integrally with the flange 3 of the seal S is a cover portion 5, which is of substantially the same shape and dimensions as the top flanged portion of the main body portion of the seal. The cover portion 5 is joined to the flange seal. 3 by a portion 6 of material, and this cover portion is movable from the position in which it is shown in Fig. 5 to the intermediate position illustrated in Figs. 3 and 4, and to the closed position shown in Figs. 1 and 2, the portion 6 of material being bent transversely when the cover portion is subjected to such movement as shown in Figs. 1, 2, 3, and 4. The cover portion 5 is provided with groups of apertures 7 which are located adjacent to the marginal edge of said cover portion. In forming these apertures, the material displaced from the cover portion is not entirely removed from said cover portion, but instead said material is pressed downwardly in the form of flanges or burrs 8 which entirely or partially surround the apertures and project from the inner face of the cover portion. The flanges or burrs 8 being formed of soft material are capable of being bent or turned over when they are moved into forcible contact with the flange 3 of the seal when the cover portion is moved to the closed position shown in Figs. 1 and 2.

In the use of our improved seal, the cylindrical body portion 1 thereof is introduced into the open, upper end of the lager valve A, a gasket M first being arranged in place so that it will be interposed between the flange 3 of the seal and the outer face of the flange portion B' of the lager valve. When the seal is being applied to a valve the cover portion 5 of the seal is thrown back, as shown in Fig. 5, and when the cylindrical body portion has been arranged in the hollow body of the valve as described, a suitable tool is introduced into the cylindrical body portion 1 of the valve and the lower portion of said body portion is expanded, as shown at 9 in Figs. 1, 3, and 4. Such expansion of the lower portion of the main body portion 1 of the seal produces an annular shoulder 9' on the body portion of the seal which contacts with the inner faces of the inwardly extended portions D of the valve, whereby the seal will be positively locked to the valve in such manner that the seal may not be removed from the valve without mutilating said seal.

After the seal has been applied to the valve as described, the Government stamp, a representation of which is designated by the reference character N, is laid across the top of the valve and across the flanged upper end of the seal S and is affixed beyond opposite sides of the valve A to the container with which the valve is associated. The cover portion 5 of the seal is then moved to its closed position, as shown in Fig. 1, the seal bending during such movement of the cover portion transversely of the portion of material 6 of the seal. When the cover portion is moved to its closed position, the flanges or burrs 8 at the apertures 7 pass through the Government stamp N, and when these flanges contact with the flange 3 of the seal they are bent over or clinched. Thus the stamp is canceled by mutilation and is positively secured to the seal so that any attempted removal of the seal will tear the stamp. When the cover portion has been moved to its closed position as described, the arcuate extension 4 is crimped over so as to engage a marginal edge portion of the cover portion 5, as shown in Figs. 1 and 2 and in this manner fasten the cover portion securely in its closed position.

From the foregoing it is obvious that a lager valve with which our seal is associated is very securely sealed against passage into the valve of dirt or other foreign matter. Also, it is quite plain that the seal may not be removed without mutilating same to such extent that such removal, or any attempt at removal, of the seal could be detected. Furthermore, the Government stamp is perforated and fastened to the seal so that the seal may not be removed without destroying the stamp.

When an authorized person desires to remove a seal, this may be accomplished by merely inserting a sharp edge of a suitable instrument beneath the flange 3 of the seal and prying the seal upwardly. This will result in the soft metal of the expanded portion 9 of the seal being displaced and distorted sufficiently to destroy the locking action between the expanded portion 9 of the seal and the portions D of the valve, whereupon the seal may be withdrawn from the valve.

In Fig. 6 we illustrate a modified form of the invention in accordance with which the body portion 1' of the seal extends to a greater depth within the interior of the valve, and a suitable gasket M' is associated with the bottom wall 2' of said body portion and is interposed between said bottom wall 2' and a raised portion K$^a$, which is formed on the inner wall K' of the valve body and surrounds the opening L' formed through said wall K'. When this form of the invention is employed, no gasket is employed between the flange of the seal and the outer face of the flange portion of the valve, as shown in Figs. 1, 2, and 3.

If desired portions 9$^a$ may be formed on the seal before it is inserted into the valve, instead of being produced after such insertion of the seal into the valve as already explained herein. In this case the portions 9$^a$ will be of the proper shape and arrangement to be inserted into the valve through the openings D$^a$ at the top thereof, after which the seal will be rotated with respect to the valve so as to cause the portions 9$^a$ to engage beneath the inwardly extended portions D of the valve. When this arrangement is employed portions of the seal will be expanded into the opening D$^a$ of the valve, as shown by dotted lines at 9$^b$ in Fig. 7, by a suitable tool to prevent rotation of the seal with respect to the valve in an unauthorized attempt to remove the seal from the valve.

We claim:

1. A seal for a valve which includes a hollow valve body open at an end thereof and provided within said hollow body with an inwardly extended portion, said seal comprising a hollow, cylindrical body portion having a solid bottom wall, a projected portion on said body portion which engages beneath said inwardly extended portion of said valve body, a flange formed on said seal which contacts with a face of the valve in a manner to produce a tight joint between said seal and said valve body, and a rigid cover portion movably connected to said flange and adapted to close an open end of said hollow, cylindrical body portion.

2. A seal for a valve which includes a hollow valve body open at an end thereof and provided within said hollow body with an inwardly extended portion, said seal comprising a hollow, cylindrical body portion having a solid bottom wall, a projected portion on said body portion which engages beneath said inwardly extended portion of said valve body, a flange formed on said seal which contacts with a face of the valve in a manner to produce a tight joint between said seal and said valve body, a cover portion movably connected to said flange and adapted to close an open end of said hollow, cylindrical body portion, and means associated with said flange for securing said cover portion in its closed position.

3. A seal for a valve which includes a hollow valve body open at an end thereof and provided within said hollow body with an inwardly extended portion, said seal comprising a hollow, cylindrical body portion having a solid bottom wall, a projected portion on said body portion which engages beneath said inwardly extended portion of said valve body, a flange formed on said seal which contacts with a face of the valve in a manner to produce a tight joint between said seal and said valve body, a cover portion movably connected to said flange and adapted to close an open end of said hollow, cylindrical body portion, and means for securing said cover portion in its closed position, said means comprising a portion of material formed on said flange and adapted to be crimped over so as to engage a marginal edge portion of said cover portion.

4. A seal for a valve which includes a hollow valve body open at an end thereof and provided within said hollow body with an inwardly extended portion, said seal comprising a hollow cylindrical body portion having a solid bottom wall, a projected portion on said body portion which engages beneath said inwardly extended portion of said valve body, a flange formed on said seal which contacts with a face of the valve in a manner to produce a tight joint between said seal and said valve body, a cover portion hingedly connected to said flange and adapted to close an open end of said hollow, cylindrical body portion, means for securing said cover portion in its closed position, and means associated with said cover portion for engaging a stamp associated with said valve.

5. A seal for a valve which includes a hollow valve body open at an end thereof and provided within said hollow body with an inwardly extended portion, said seal comprising a hollow cylindrical body portion having a solid bottom wall, a projected portion on said body portion which engages beneath said inwardly extended portion of said valve body, a flange formed on said seal which contacts with a face of the valve in a manner to produce a tight joint between said seal and said valve body, a cover portion hingedly connected to said flange and adapted to close an open end of said hollow, cylindrical body portion, means for securing said cover portion in its closed position, and means associated with said cover portion for engaging a stamp associated with said valve, the last-mentioned means comprising projected portions on said cover portion which pass through said stamp and are clinched by contact with the flange of the body portion of the seal.

6. A seal for a valve which includes a hollow valve body open at an end thereof and provided within said shallow body with an inwardly extended portion, said seal comprising a hollow cylindrical body portion having a solid bottom wall, a projected portion on said body portion which engages beneath said inwardly extended portion of said valve body, a flange formed on said seal which contacts with a face of the valve in a manner to produce a tight joint between said seal and said valve body, a cover portion hingedly connected to said flange and adapted to close an open end of said hollow, cylindrical body portion, means for securing said cover portion in its closed position, and means associated with said cover portion for engaging a stamp associated with said valve, the last-mentioned means comprising projected portions displaced from said cover portion which pass through said stamp and are clinched by contact with the flange of the body portion of the seal.

ARTHUR J. FAUSEK.
IRWING F. FAUSEK.